United States Patent
Yan et al.

(10) Patent No.: US 11,852,282 B2
(45) Date of Patent: *Dec. 26, 2023

(54) GIMBAL AND LOCKING STRUCTURE

(71) Applicant: SZ DJI TECHNOLOGY CO., LTD., Shenzhen (CN)

(72) Inventors: Xin Yan, Shenzhen (CN); Xifeng Zhao, Shenzhen (CN); Rongjian Sun, Shenzhen (CN); Zhuo Guo, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 14 days.

This patent is subject to a terminal disclaimer.

(21) Appl. No.: 17/651,786

(22) Filed: Feb. 18, 2022

(65) Prior Publication Data
US 2022/0170585 A1 Jun. 2, 2022

Related U.S. Application Data

(63) Continuation of application No. 16/989,336, filed on Aug. 10, 2020, now Pat. No. 11,255,481, which is a
(Continued)

(51) Int. Cl.
*F16M 11/00* (2006.01)
*F16M 11/12* (2006.01)
(Continued)

(52) U.S. Cl.
CPC ........... *F16M 11/123* (2013.01); *F16M 11/04* (2013.01); *F16M 11/16* (2013.01);
(Continued)

(58) Field of Classification Search
CPC ...... F16M 11/123; F16M 11/04; F16M 11/16; F16M 11/18; F16M 13/00; F16M 13/02;
(Continued)

(56) References Cited

U.S. PATENT DOCUMENTS

| | | |
|---|---|---|
| 4,447,033 A | 5/1984 | Jaumann et al. |
| 4,690,252 A | 9/1987 | Kottke et al. |
| (Continued) | | |

FOREIGN PATENT DOCUMENTS

| | | |
|---|---|---|
| CN | 2585372 Y | 11/2003 |
| CN | 1556439 A | 12/2004 |
| (Continued) | | |

OTHER PUBLICATIONS

The World Intellectual Property Organization (WIPO) International Search Report for PCT/CN2015/088243 dated Apr. 26, 2016 6 Pages(including translation).
(Continued)

*Primary Examiner* — Amy J. Sterling
(74) *Attorney, Agent, or Firm* — ANOVA LAW GROUP, PLLC

(57) ABSTRACT

A gimbal includes an axis structure including a rotating member, a bearing member rotatably connected to the rotating member, and a locking structure. The rotating member includes a rotor of a motor or a member fixedly connected to a rotor. The bearing member includes a stator of the motor or a member fixedly connected to a stator. The locking structure includes a positioning snap member movably provided on one of the rotating member and the bearing member and configured to engage with another one of the rotating member and the bearing member. The axis structure is a yaw-axis structure, a roll-axis structure or a pitch-axis structure. The motor is configured to control a movement about a pitch axis, a movement about a yaw axis, or a movement about a roll axis. A rotational position of the rotating member relative to the bearing member is locked by the locking structure when the rotating member rotates to a preset position.

15 Claims, 18 Drawing Sheets

Related U.S. Application Data continuation of application No. 16/525,052, filed on Jul. 29, 2019, now Pat. No. 10,753,532, which is a continuation of application No. 15/906,866, filed on Feb. 27, 2018, now Pat. No. 10,400,939, which is a continuation of application No. PCT/CN2015/088243, filed on Aug. 27, 2015.

(51) Int. Cl.
| | |
|---|---|
| *F16M 13/00* | (2006.01) |
| *G03B 17/56* | (2021.01) |
| *F16M 13/02* | (2006.01) |
| *F16M 11/18* | (2006.01) |
| *F16M 11/04* | (2006.01) |
| *F16M 11/16* | (2006.01) |

(52) U.S. Cl.
CPC ............ *F16M 11/18* (2013.01); *F16M 13/00* (2013.01); *F16M 13/02* (2013.01); *G03B 17/56* (2013.01); *F16M 2200/022* (2013.01)

(58) Field of Classification Search
CPC ... F16M 2200/022; G03B 17/56; Y02E 60/10
See application file for complete search history.

(56) References Cited

U.S. PATENT DOCUMENTS

| | | | |
|---|---|---|---|
| 5,887,849 A | | 3/1999 | Holmes et al. |
| 8,938,161 B2 | * | 1/2015 | Webb ................ H04N 23/6812 396/421 |
| 9,280,038 B1 | | 3/2016 | Pan et al. |
| 10,400,939 B2 | | 9/2019 | Yan et al. |
| 2005/0161560 A1 | | 7/2005 | Kjellman |
| 2006/0060735 A1 | | 3/2006 | Oddsen, Jr. et al. |
| 2007/0295874 A1 | | 12/2007 | Hollenhead et al. |
| 2012/0049035 A1 | | 3/2012 | Black et al. |
| 2014/0010525 A1 | | 1/2014 | Chapman |
| 2016/0381271 A1 | | 12/2016 | Cheng et al. |
| 2017/0227834 A1 | | 8/2017 | Zhao et al. |
| 2019/0089871 A1 | | 3/2019 | Pan et al. |
| 2019/0161208 A1 | * | 5/2019 | Sun ........................ B64C 39/024 |
| 2019/0226636 A1 | | 7/2019 | Saika et al. |
| 2020/0213518 A1 | * | 7/2020 | Su ............................ G05D 3/12 |
| 2022/0074544 A1 | * | 3/2022 | Zhao ..................... F16M 11/18 |
| 2022/0082908 A1 | * | 3/2022 | Zhao ..................... F16M 11/08 |

FOREIGN PATENT DOCUMENTS

| | | |
|---|---|---|
| CN | 201765421 U | 3/2011 |
| CN | 102148106 A | 8/2011 |
| CN | 202647108 U | 1/2013 |
| CN | 203050293 U | 7/2013 |
| CN | 203477794 U | 3/2014 |
| CN | 103754379 A | 4/2014 |
| CN | 103926940 U | 7/2014 |
| CN | 203731035 U | 7/2014 |
| CN | 203902846 U | 10/2014 |
| CN | 204250379 U | 4/2015 |
| CN | 204403718 U | 6/2015 |
| CN | 204437591 U | 7/2015 |
| CN | 204901224 U | 12/2015 |
| DE | 202005006620 U1 | 6/2005 |
| DE | 102008020084 A1 | 9/2008 |
| GB | 1400956 A | 7/1975 |
| JP | S61191174 A | 8/1986 |
| JP | H05150359 A | 6/1993 |
| JP | 2005234230 A | 9/2005 |
| JP | 3175743 U | 5/2012 |
| JP | 2013180374 A | 9/2013 |
| NL | 1032023 C2 | 12/2007 |
| WO | 2015041597 A1 | 3/2015 |

OTHER PUBLICATIONS

State Intellectual Property Office of the People's Republic of China(SIPO) invalidation Request Review Decision for Case No. 5W116002 mailed on Apr. 25, 2019.

\* cited by examiner

GIMBAL AND LOCKING STRUCTURE

CROSS-REFERENCE TO RELATED APPLICATIONS

This application is a continuation of application Ser. No. 16/989,336, filed on Aug. 10, 2020, which is a continuation of application Ser. No. 16/525,052, filed on Jul. 29, 2019, now U.S. Pat. No. 10,753,532, which is a continuation of application Ser. No. 15/906,866, filed on Feb. 27, 2018, now U.S. Pat. No. 10,400,939, which is a continuation application of International Application No. PCT/CN2015/088243, filed on Aug. 27, 2015, the entire contents of all of which are incorporated herein by reference.

TECHNICAL FIELD

The disclosure relates to a gimbal and, more particularly, to a locking structure for locking a motor shaft of a gimbal in a non-operational state and a method of controlling a gimbal.

BACKGROUND

A three-axis gimbal comprises motors for driving the gimbal to rotate about three axes, including a pitch-axis motor controlling a movement about a pitch axis, a yaw-axis motor controlling a movement about a yaw axis, and a roll-axis motor controlling a movement about a roll axis. A gimbal can rotate within particular angular ranges about the pitch axis, the yaw axis, and the roll axis, respectively. For example, a gimbal can rotate in an angular range of −135° to +45° about the pitch axis, in an angular range of −330° to +330° about the yaw axis, and in an angular range of −45° to +45° about the roll axis. In other words, existing gimbals are provided with limiting structures to limit an operating angle in an operational state. However, attitude of the gimbal is not locked when the gimbal is in a non-operational state, making it inconvenient to store or transport the gimbal.

SUMMARY

In accordance with the disclosure, there is provided a gimbal including a yaw-axis structure and a locking structure. The yaw-axis structure includes a rotating member and a bearing member rotatably connected to the rotating member. The locking structure is coupled to the rotating member and includes a cover fixed on the rotating member with a receiving slot formed between the cover and the rotating member, a locking switch received in the receiving slot and being slidable along the receiving slot, and a positioning snap member. One end of the positioning snap member is connected to the locking switch via an elastic member. Another end of the positioning snap member includes a snap-fit portion configured to be snapped to the bearing member to effect a yaw-axis locking of the gimbal when the locking switch is pushed downwards to exert a pressure on the positioning snap member via the elastic member and the snap-fit portion is aligned with a preset position of the bearing member.

Also in accordance with the disclosure, there is provided a locking structure including a cover a locking switch, and a positioning snap member. The locking structure is configured to be fixed on a rotating member of a yaw-axis structure of a gimbal and form a receiving slot between the cover and the rotating member. The locking switch is configured to be received in the receiving slot and slidable along the receiving slot. One end of the positioning snap member is connected to the locking switch via an elastic member, and another end of the positioning snap member includes a snap-fit portion. The snap-fit portion is configured to be snapped to a bearing member of the yaw-axis structure to effect a yaw-axis locking of the gimbal when the locking switch is pushed downwards to exert a pressure on the positioning snap member via the elastic member and the snap-fit portion is aligned with a preset position of the bearing member.

Also in accordance with the disclosure, there is provided a handle gimbal including a handle and a gimbal coupled to the handle. The handle includes a battery compartment. The gimbal including a yaw-axis structure connected to the handle and including a locking structure, a roll-axis structure connected to the yaw-axis structure and configured to be rotated by the yaw-axis structure, and a pitch-axis structure connected to the roll-axis structure and configured to be rotated by the roll-axis structure. The pitch-axis structure is further configured to support a load and drive the load to rotate. The yaw-axis structure is configured to be locked by the locking structure when the yaw-axis structure rotates to a preset position in a non-operational state of the gimbal.

DETAILED DESCRIPTION OF THE EMBODIMENTS

Technical solutions of the present disclosure will be described with reference to the drawings. It will be appreciated that embodiments as described in the disclosure are some rather than all of the embodiments of the present disclosure. Other embodiments, which are conceived by those having ordinary skills in the art on the basis of the disclosed embodiments without inventive efforts, should fall within the scope of the present disclosure.

Figure 1:
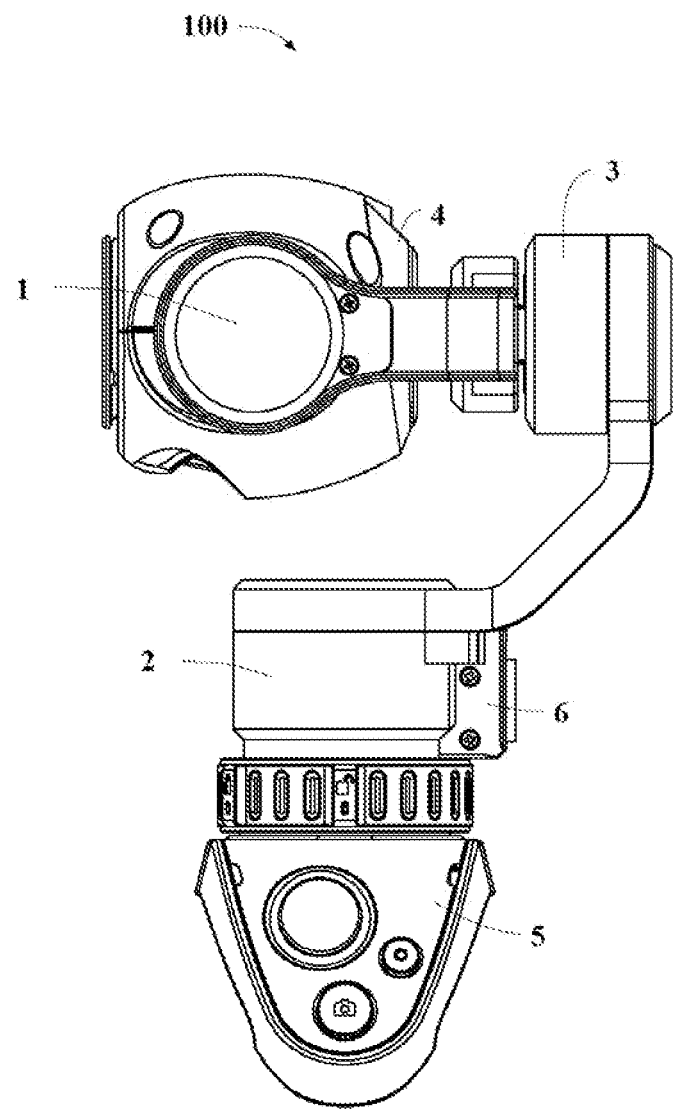
FIG. 1 shows a structure of a gimbal in accordance with an embodiment of the disclosure.
Figure 2:
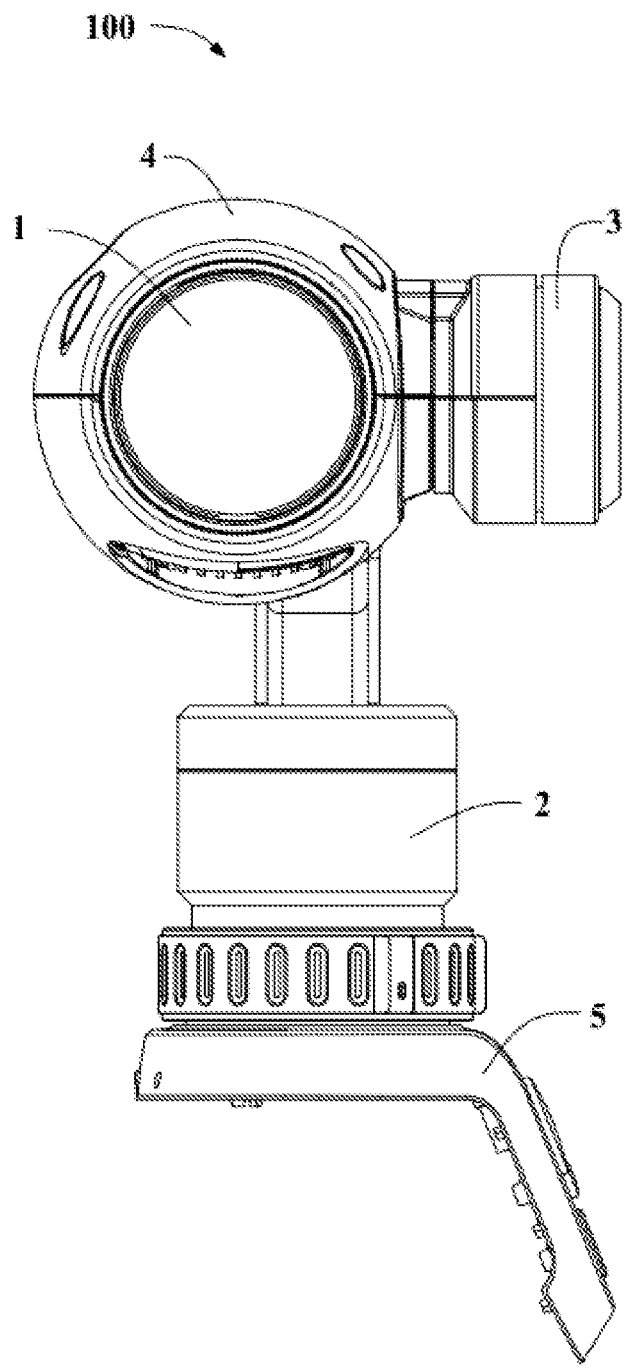
FIG. 2 shows a structure of the gimbal of FIG. 1 viewed from another direction.

FIGS. 1 and 2 show a gimbal 100 in accordance with an embodiment of the disclosure. The gimbal 100 can be a three-axis gimbal comprising a pitch-axis structure 1, a yaw-axis structure 2, and a roll-axis structure 3. A camera 4 can be attached to the pitch-axis structure 1. A motor of the pitch-axis structure 1 can drive the camera 4 to perform a pitch movement about the pitch axis. The pitch-axis structure 1 is attached to the roll-axis structure 3, and a motor of the roll-axis structure 3 can drive the camera 4 to perform a roll movement about the roll axis. The roll-axis structure 3 is attached to the yaw-axis structure 2, and a motor of the yaw-axis structure 2 can drive the camera 4 to perform a yaw movement about the yaw axis. The yaw-axis structure 2 is attached to a base 5 through which the gimbal can be mounted onto a fixing surface (not shown).

The gimbal 100 further comprises a locking structure 6. In some embodiments, as shown in FIG. 1, the locking structure 6 is provided at the yaw-axis structure 2 and configured to limit a rotation of the gimbal 100 about the yaw axis in a non-operational state (hereinafter referred to as a "yaw-axis locking").

It will be appreciated that, the technical solution provided in the disclosure can be applied to a two-axis gimbal although a three-axis gimbal is shown throughout the drawings. For example, the locking structure 6 can be provided at a yaw-axis structure of a two-axis gimbal to effect a yaw-axis locking when the two-axis gimbal is in a non-operational state.

Figure 3:
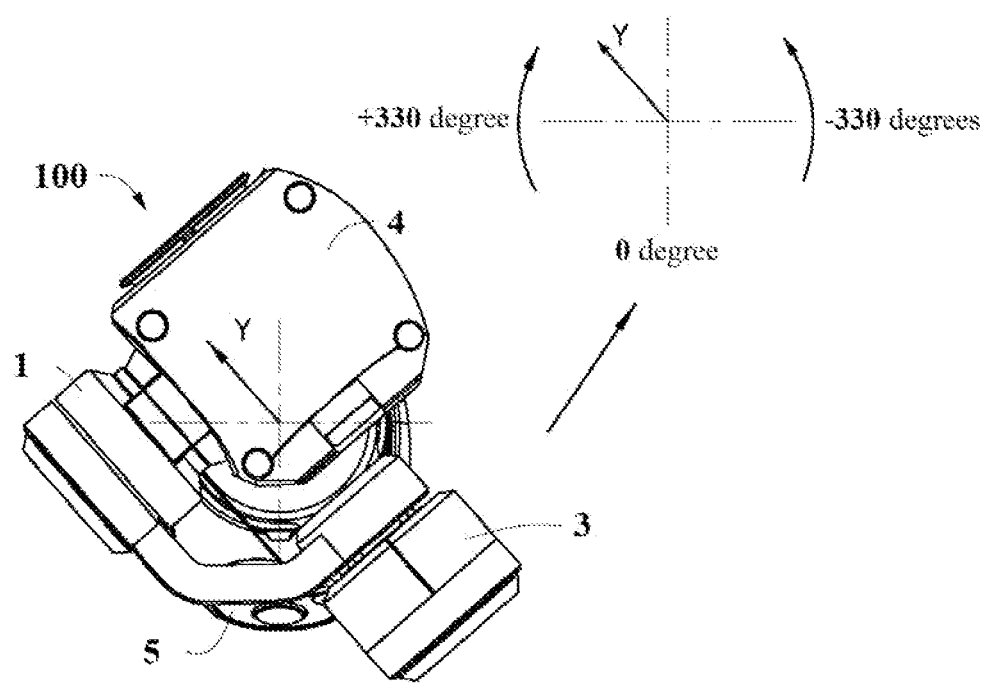
FIG. 3 shows an operating angle range of the gimbal of FIG. 1 about a yaw axis in accordance with an embodiment.
Figure 4:
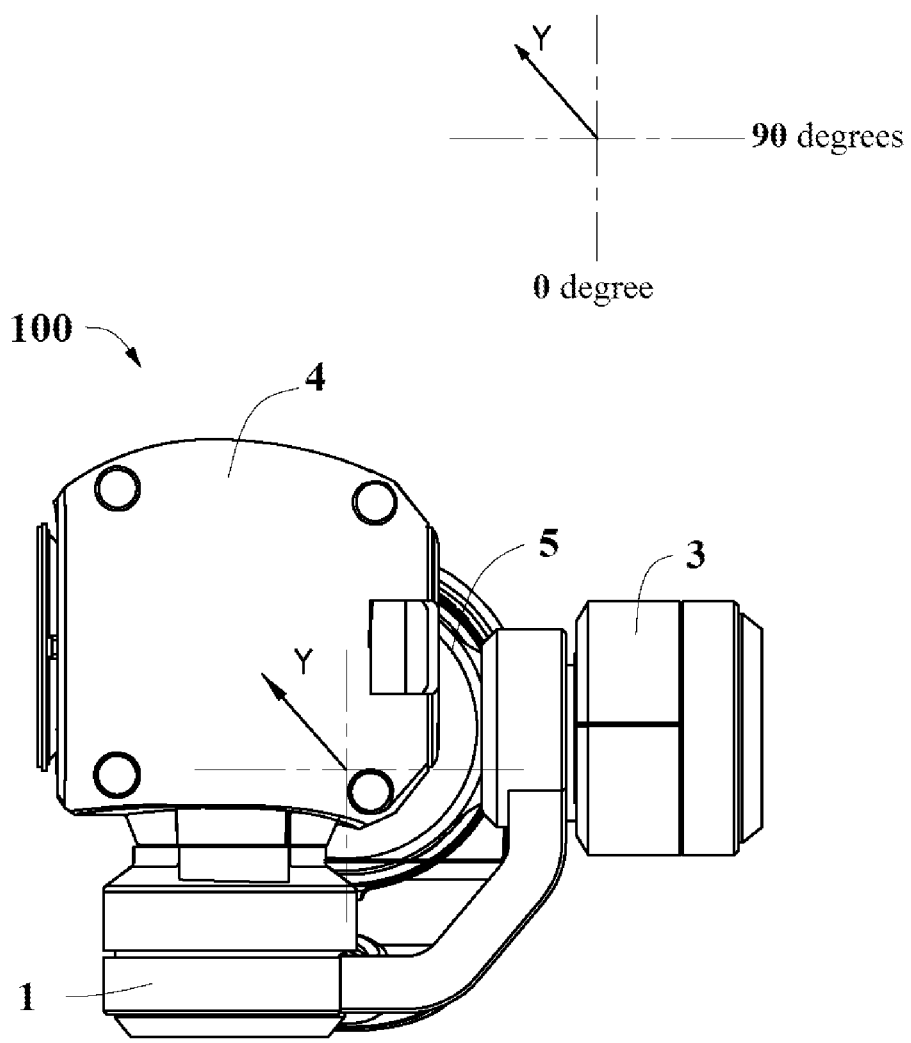
FIG. 4 shows an angle at which the gimbal of FIG. 1 is locked with respect to the yaw axis in accordance with an embodiment.
Figure 5:
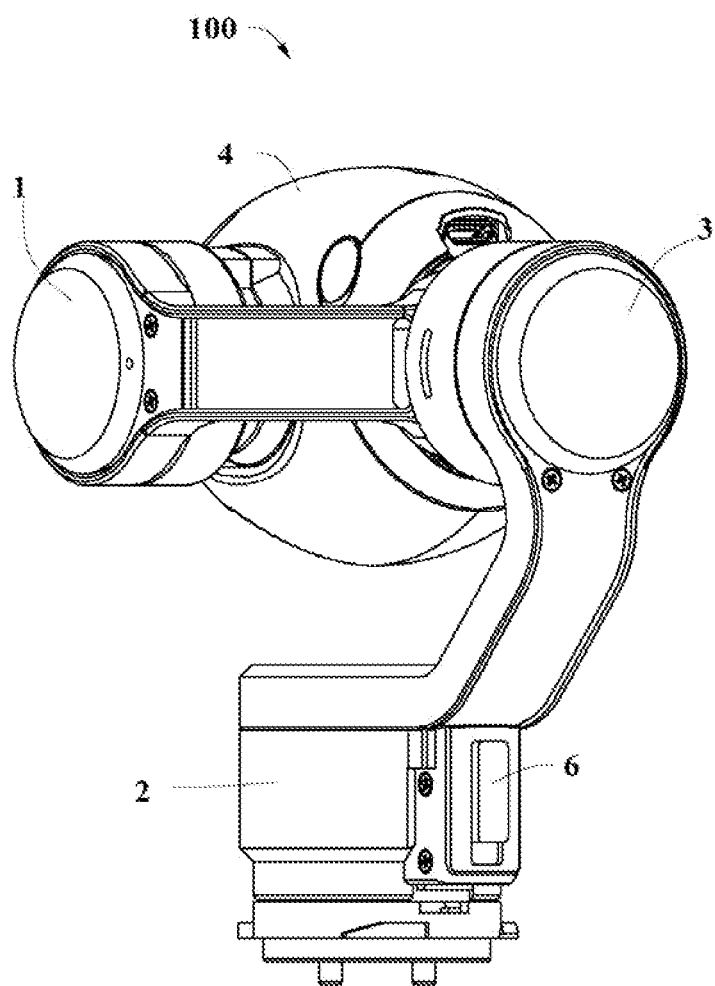
FIG. 5 shows a structure of the gimbal of FIG. 1 with some components thereof being removed.
Figure 6:
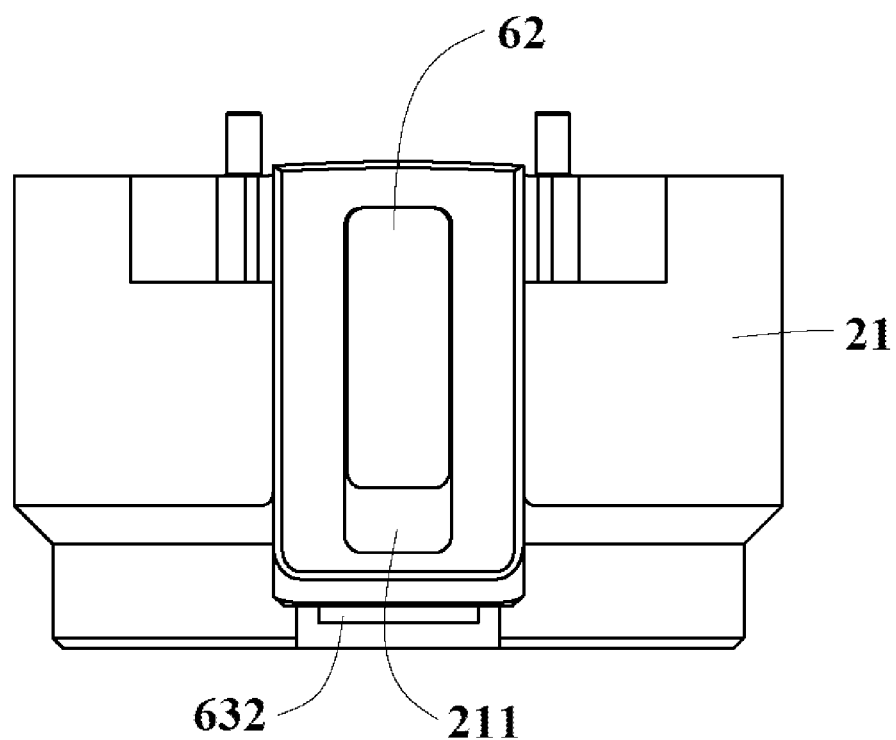
FIG. 6 shows a front view of a locking structure of the gimbal of FIG. 1.
Figure 7:
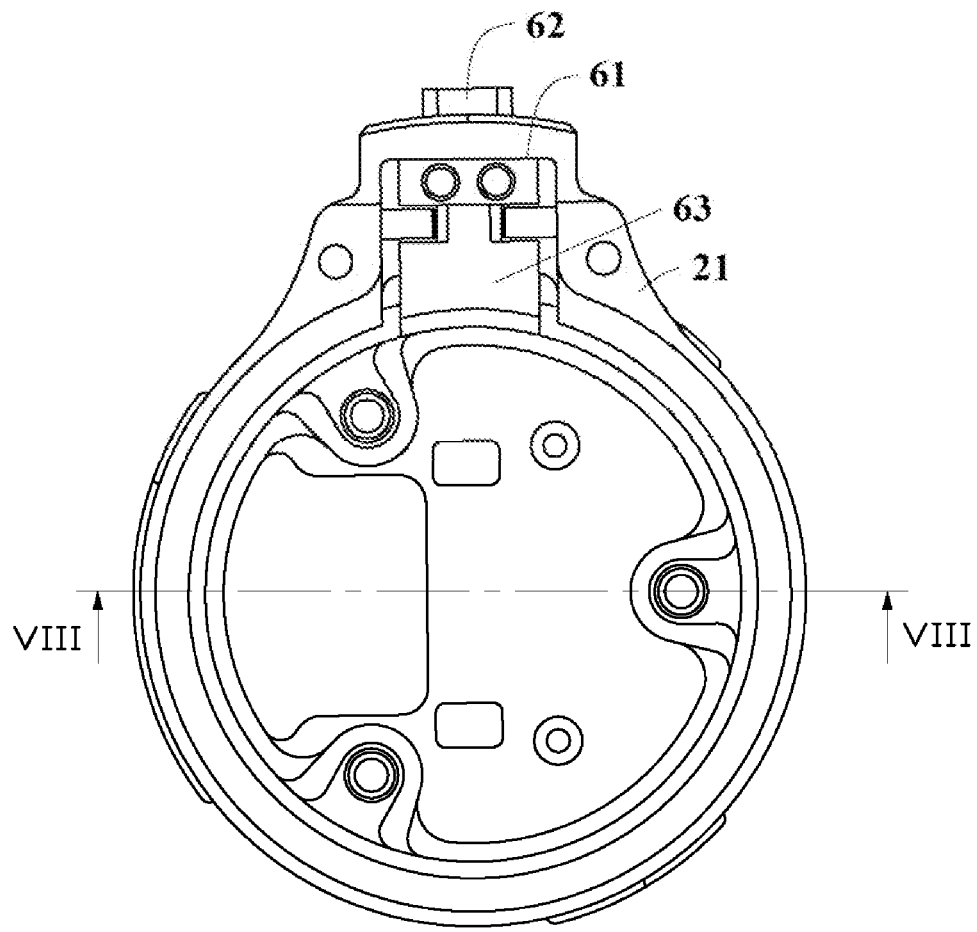
FIG. 7 shows a top view of the locking structure of the gimbal of FIG. 6.

FIGS. 3 and 4 schematically show the rotation of the gimbal 100 about the yaw axis in the operational and the non-operational states, respectively. As shown in FIGS. 3 and 4, a Cartesian coordinate system is established with respect to a center of rotation of the yaw-axis structure 2 of the gimbal 100 (i.e., the yaw axis, denoted by Y). FIG. 3 shows an operating angle range from, e.g., about −330° (i.e., about 330° in a counterclockwise direction) to about +330° (i.e., about 330° in a clockwise direction) of the gimbal 100 about the yaw axis in accordance with an embodiment. FIG. 4 shows that the roll-axis structure 3 has rotated about the yaw axis for an angle of, e.g., about −90° (i.e., about 90° in a counterclockwise direction) when the yaw axis of the gimbal 100 is locked in the non-operational state.

FIGS. 5 to 10 show a structure of the locking structure 6 in accordance with an embodiment of the disclosure. In some embodiments, as shown in FIGS. 6-10, the locking structure 6 comprises a locking switch 61, a switch cap 62, a positioning snap member 63, an elastic member 64, and a cover 65.

The cover 65 is fixed onto a rotating member 21 of the yaw-axis structure 2. In some instances, the cover 65 can be fixed onto the rotating member 21 using a screw. A receiving slot 66 is formed between the cover 65 and the rotating member 21. The locking switch 61 and the positioning snap member 63 are received in the receiving slot 66 and configured to be slidable along the receiving slot 66. The switch cap 62 is rigidly connected to the locking switch 61. In some embodiments, the switch cap 62 can be fixed to the locking switch 61 using a screw. The rotating member 21 includes an open slot 211 in which the switch cap 62 is received. The switch cap 62 can be slid along the open slot 211, to control the locking switch 61 to slide along the receiving slot 66.

Figure 8:
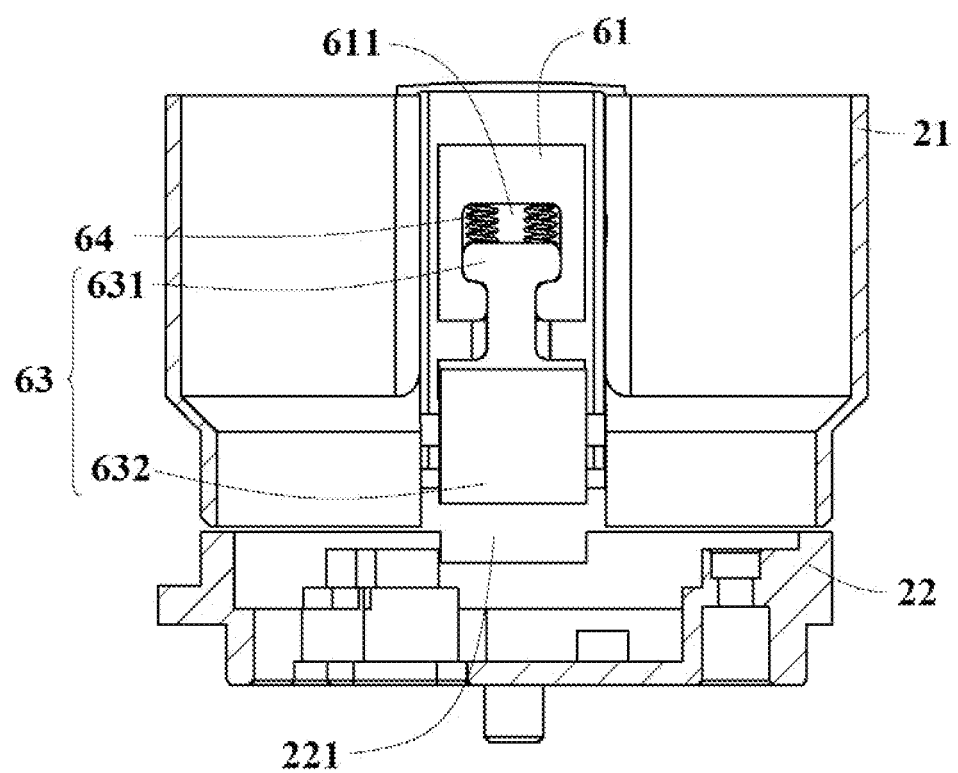
FIG. 8 shows a sectional view taken along VIII-VIII of FIG. 7.
Figure 9:
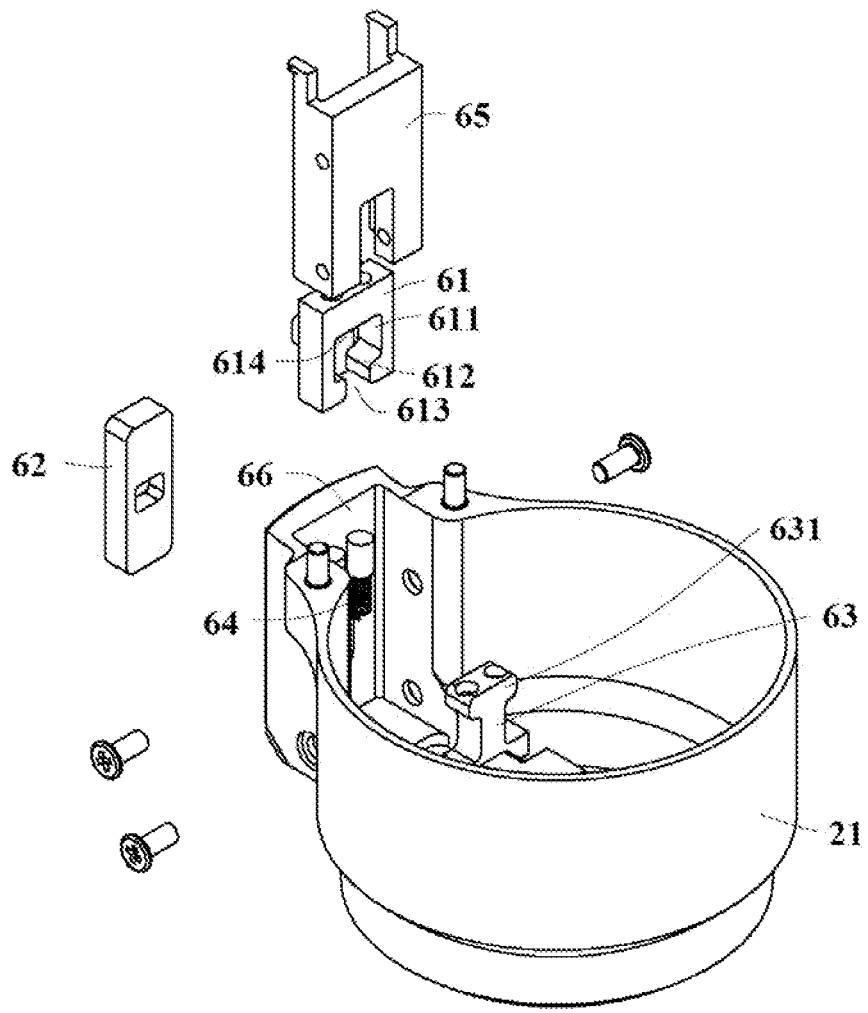
FIG. 9 and FIG. 10 show exploded views from different angles of the locking structure of the gimbal of FIG. 1.
Figure 10:
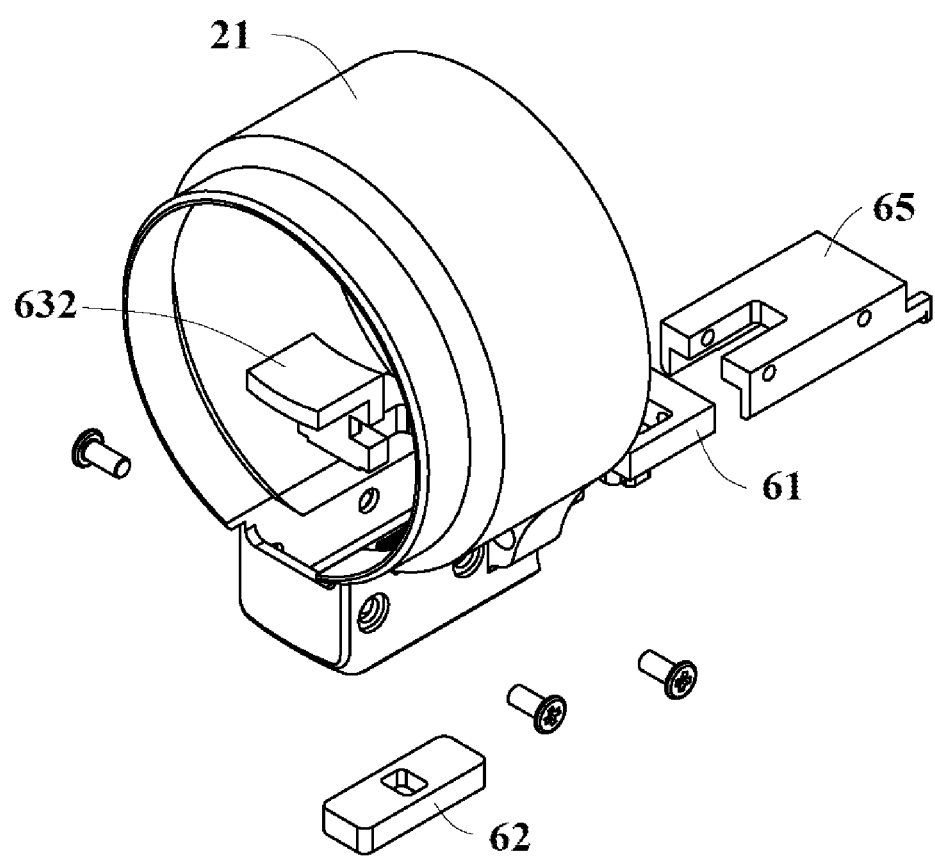

The locking switch 61 is connected to the positioning snap member 63 via the elastic member 64 (e.g., a spring assembly). A relative movement between the positioning snap member 63 and the locking switch 61 can be effected as the elastic member 64 is capable of being compressed and stretched. In some embodiments, as shown in FIG. 9, the locking switch 61 has a substantially hollow-square structure. The locking switch 61 comprises a cavity 611. An opening 613 is provided at a sidewall 612 of the hollow-square structure, such that the cavity 611 of the locking switch 61 is in communication with an exterior of the locking switch 61. One end of the positioning snap member 63 has a T-shaped structure. A T-head 631 (head of the T-shaped structure) of the positioning snap member 63 can be accommodated in the cavity 611 of the locking switch 61 and connected to a sidewall 614 of the cavity 611 of the locking switch 61 opposite to the opening 613 via the elastic member 64. Except for the T-head 631, remaining portion (not labeled in the drawings) of the positioning snap member 63 can be positioned exterior to the locking switch 61 and can be continuous to the T-head 631 through the opening 613 of the locking switch 61. The other end of the positioning snap member 63 includes a snap-fit portion 632. In some embodiments, when the gimbal 100 is in the non-operational state, the gimbal 100 can be rotated about the yaw axis until the snap-fit portion 632 reaches a preset position of a bearing member 22. The bearing member 22 can be snapped at the preset position to effect the yaw-axis locking of the gimbal. In some embodiments, as shown in FIG. 8, an opening 221 is provided at the preset position of the bearing member 22 of the yaw-axis structure 2. The snap-fit portion 632 of the positioning snap member can be snapped into the opening 221 to effect the yaw-axis locking of the gimbal 100, thereby preventing the gimbal 100 from rotating about the yaw axis.

A configuration of the bearing member 22 and the rotating member 21 can be determined according to actual needs. In some embodiments, the bearing member 22 can be a stator of a motor, and the rotating member 21 can be a rotor of a motor. In some other embodiments, the bearing member 22 can be a component fixedly connected to a stator of a motor, and the rotating member 21 can be a component fixedly connected to a rotor of a motor.

In some other embodiments, the opening 221 can be replaced by a recess. For instance, a recess can be provided at the preset position of the bearing member 22 of the yaw-axis structure 2. The yaw-axis locking of the gimbal 100 in the non-operational state can be effected by the snap-fit portion 632 of the positioning snap member 63 mating with the recess. In the example shown in FIGS. 3 and 4, a preset locking position in the non-operational state is at about −90° (i.e., 90° in a counterclockwise direction). The yaw-axis locking of the gimbal 100 can be effected by rotating the gimbal about the yaw axis to the locking position and snap the snap-fit portion into the opening 221.

Figure 11:
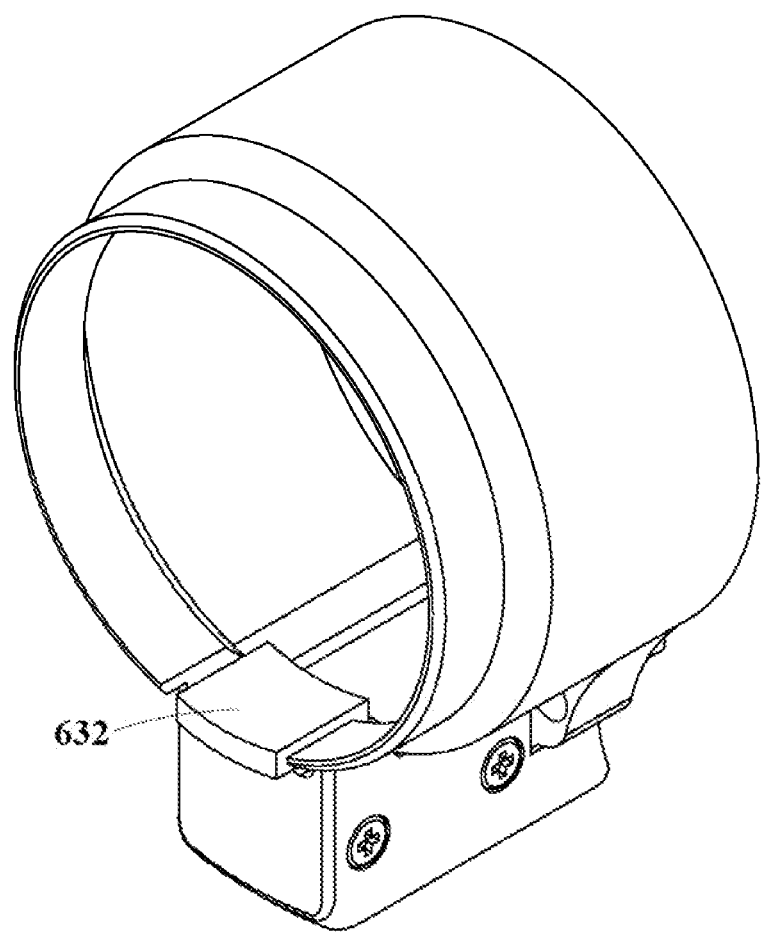
FIG. 11 shows a perspective view of the locking structure of the gimbal of FIG. 1 in accordance with another embodiment.
Figure 12:
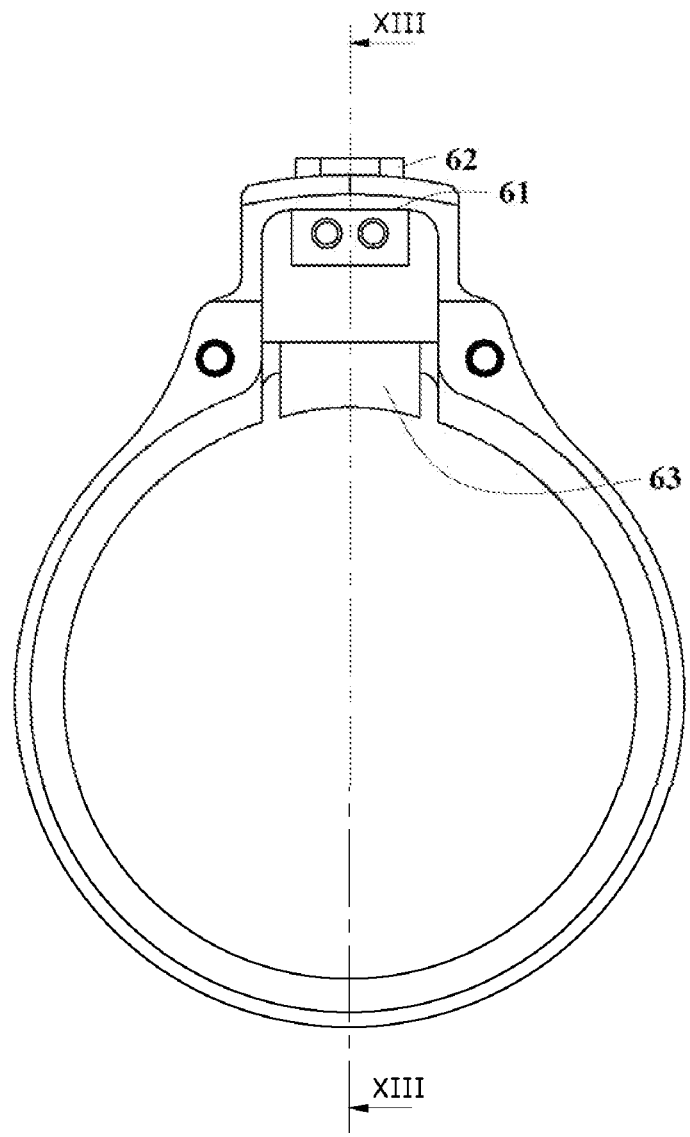
FIG. 12 shows the locking structure of the gimbal of FIG. 11 viewed from another angle.
Figure 13:
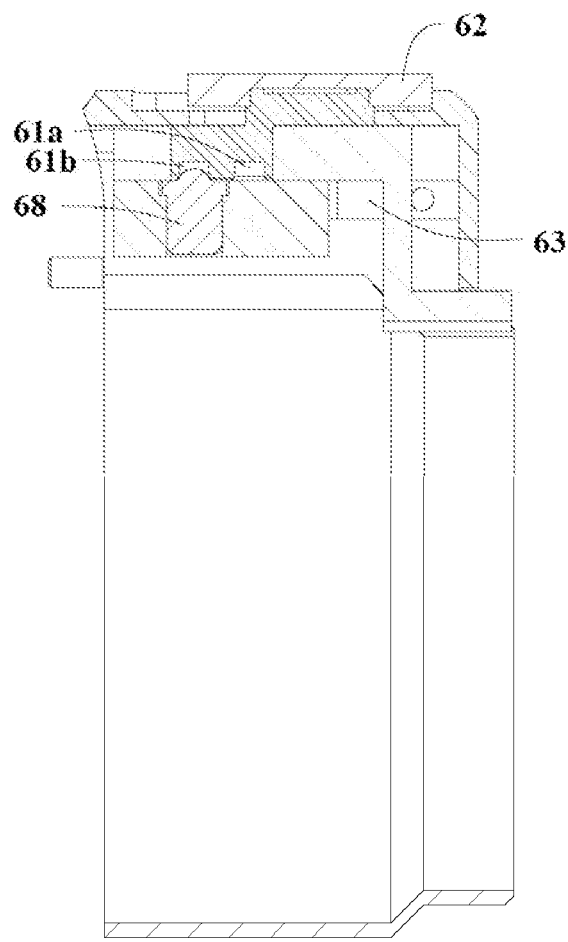
FIG. 13 shows a sectional view taken along XIII-XIII of FIG. 12.

Referring to FIGS. 11 to 13, in some embodiments, the yaw-axis structure 2 further comprises a limiting member 68. The limiting member 68 can mate with the positioning snap member 63 to limit the positioning snap member 63 when the positioning snap member 63 is slid to a locked position or a released position.

In the illustrative embodiment shown in FIGS. 11 to 13, the limiting member 68 includes an elastic pillar. The locking switch 61, which is connected to the positioning snap member 63, includes two limiting slots 61a and 61b. The elastic pillar can be held in the limiting slot 61b when the positioning snap member 63 is slid to the locked position, and the elastic pillar can be held in the other limiting slot 61a when the positioning snap member 63 is slid to the released position. In some embodiments, the two limiting slots 61a and 61b can be directly provided at the positioning snap member 63.

In some other embodiments, the limiting member 68 can include an elastic sheet. In these embodiments, the locking switch 61, which is connected to the positioning snap member 63, can include two bosses. The elastic sheet can be held at one of the bosses when the positioning snap member 63 is slid to the locked position, and the elastic pillar can be held at the other one of the bosses when the positioning snap member 63 is slid to the released position. In some embodiments, the two bosses can be directly provided on the positioning snap member 63.

A process of automatically locking the yaw axis of the gimbal will be described below in detail.

When the switch cap 62 is positioned in proximity to or at an upper end of the open slot 211 of the rotating member 21, the locking switch 61, which is rigidly connected to the switch cap 62, can be positioned in proximity to an upper end of the receiving slot 66 or at an upper end of the receiving slot 66. The positioning snap member 63 can be lifted up by the locking switch 61 via the elastic member 64, such that the snap-fit portion 632 of the positioning snap member 63 is disengaged from the opening 221 of the yaw-axis bearing member 22 and the yaw axis of the gimbal 100 is thus unlocked. A normal operation of the gimbal can be performed when the yaw axis of the gimbal 100 is unlocked.

Figure 14:
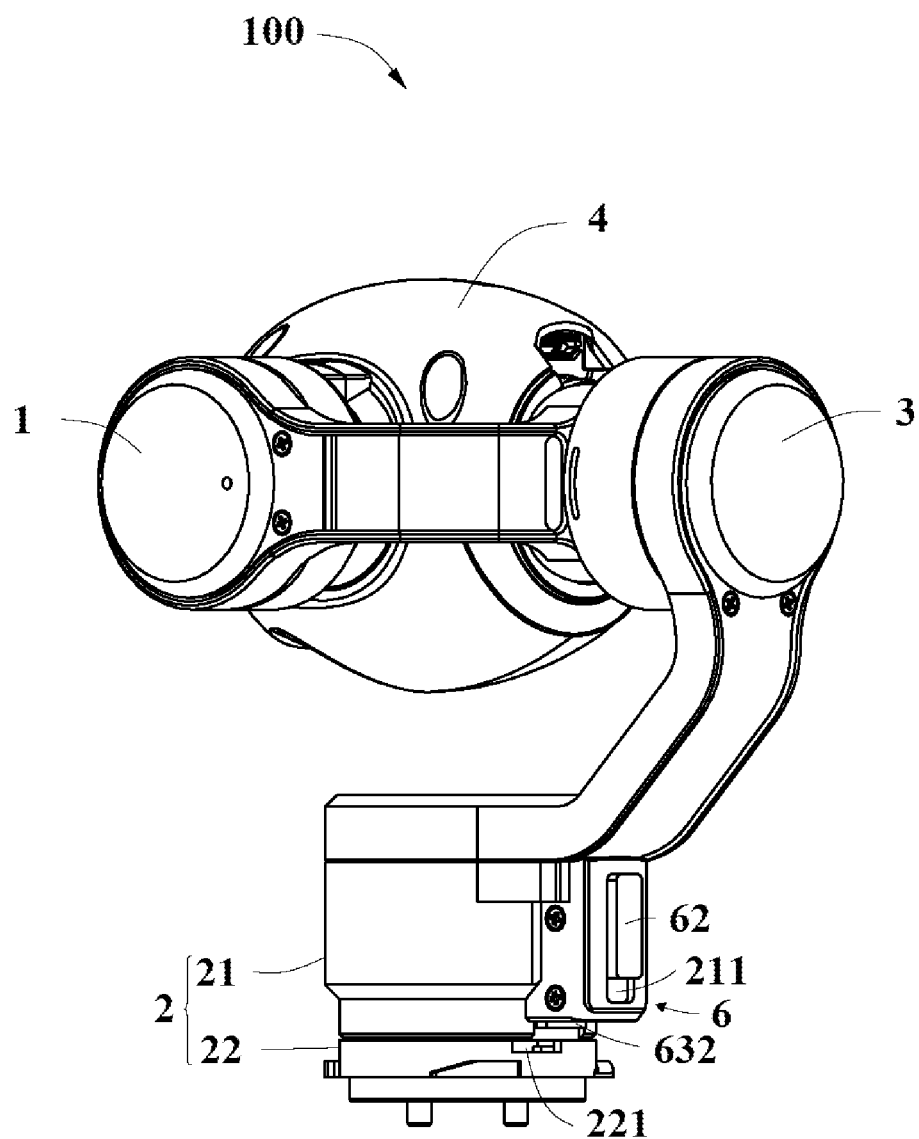
FIG. 14 and FIG. 15 show a process of performing a yaw-axis locking of the gimbal of FIG. 1.

If the yaw axis of the gimbal 100 is to be locked when the gimbal 100 is in a non-operational state, the switch cap 62 can be moved downwards to drive the locking switch 61 to move downwards in the receiving slot 66. The elastic member 64 can be compressed by the locking switch 61 to cause a downward movement of the positioning snap member 63. At this point, if the gimbal 100 is not at the preset locked position, the gimbal 100 would not be locked as the snap-fit portion of the positioning snap member 63 is not aligned with the opening 221 of the bearing member 22, as shown in FIG. 14.

Figure 15:
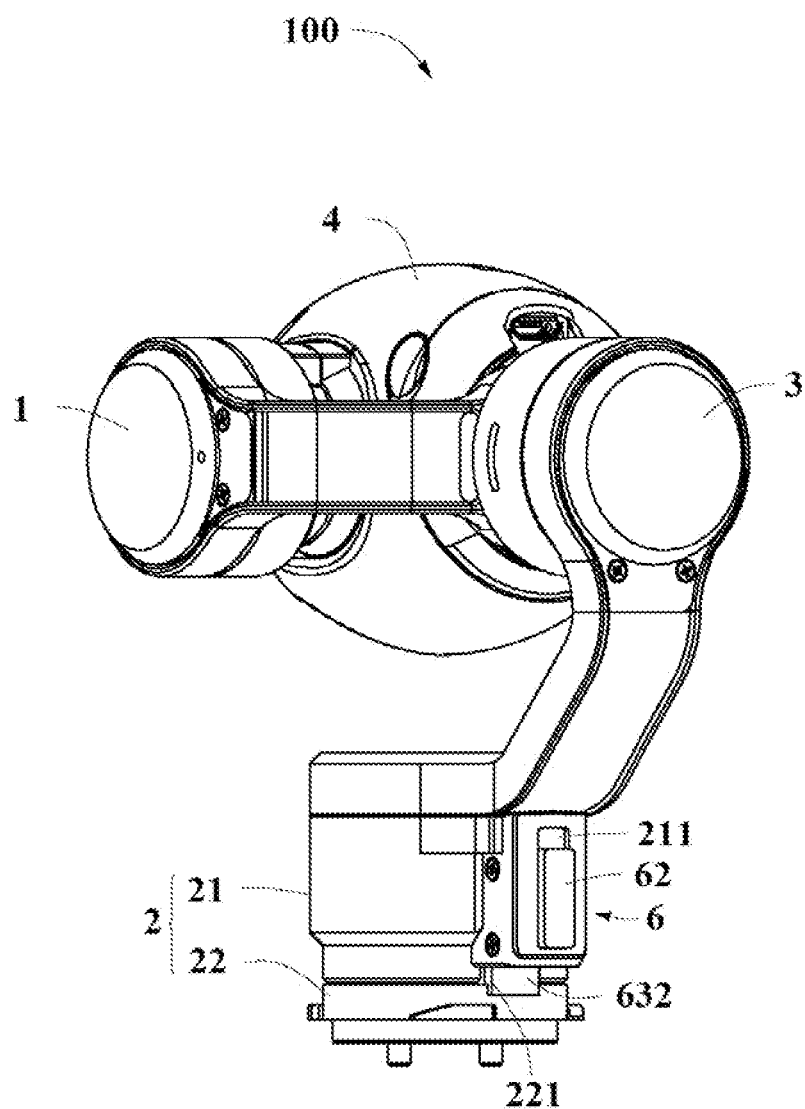

The gimbal 100 can be rotated about the yaw axis to drive the locking structure 6 to rotate. The locking structure 6 can thus be moved relative to the bearing member 22 of the yaw-axis structure 2 of the gimbal 100. When the positioning snap member 63 is rotated to a position corresponding to the opening 221 of the bearing member 22, the positioning snap member 63 can be moved downwards under the pressure of the elastic member 64, such that the snap-fit portion 632 enters the opening 221 to engage with the bearing member 22, thereby effecting the yaw-axis locking of the gimbal 100, as shown in FIG. 15.

Figure 16:
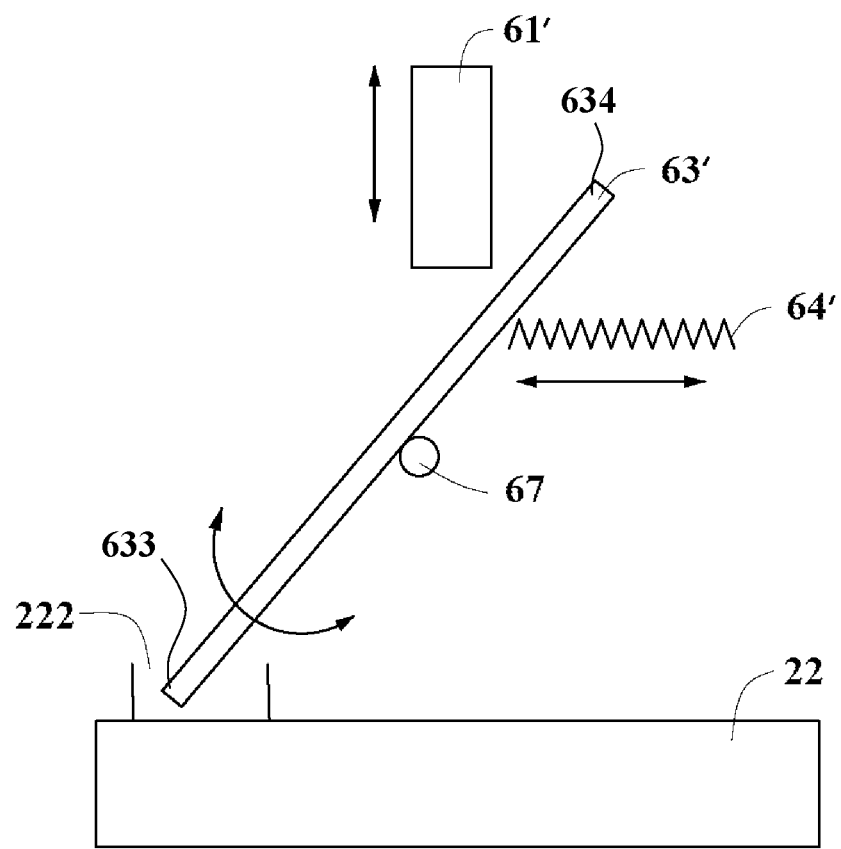
FIG. 16 is a simplified diagram showing the locking structure of the gimbal of FIG. 1 in accordance with another embodiment.

FIG. 16 is a simplified diagram showing the locking structure 6 in accordance with another embodiment. A positioning snap member 63' can be driven to rotate about a shaft 67. The positioning snap member 63' comprises an engaging end 633 and a driving end 634. The shaft 67 is provided between the engaging end 633 and the driving end 634. The engaging end 633 can be configured to engage with the bearing member 22. The driving end 634 is connected to an elastic member 64', which is capable of exerting a force onto the driving end 634. The engaging end 633 can be engaged with the bearing member 22 under the force exerted from the elastic member 64' when the bearing member 22 is rotated relative to the rotating member 21 to a preset position. In addition, the locking switch can push the driving end 634 to lift up the engaging end 633, such that the engaging end 633 is disengaged from the bearing member 22. In some embodiments, the elastic member 64' can be an elastic compressing member for providing a pushing force onto the driving end 634. The bearing member 22 can be provided with a recess 222. The engaging end 633 of the positioning snap member 63' can be engaged with the bearing member 22 by snapping to the recess 222 of the bearing member 22.

Figure 17:
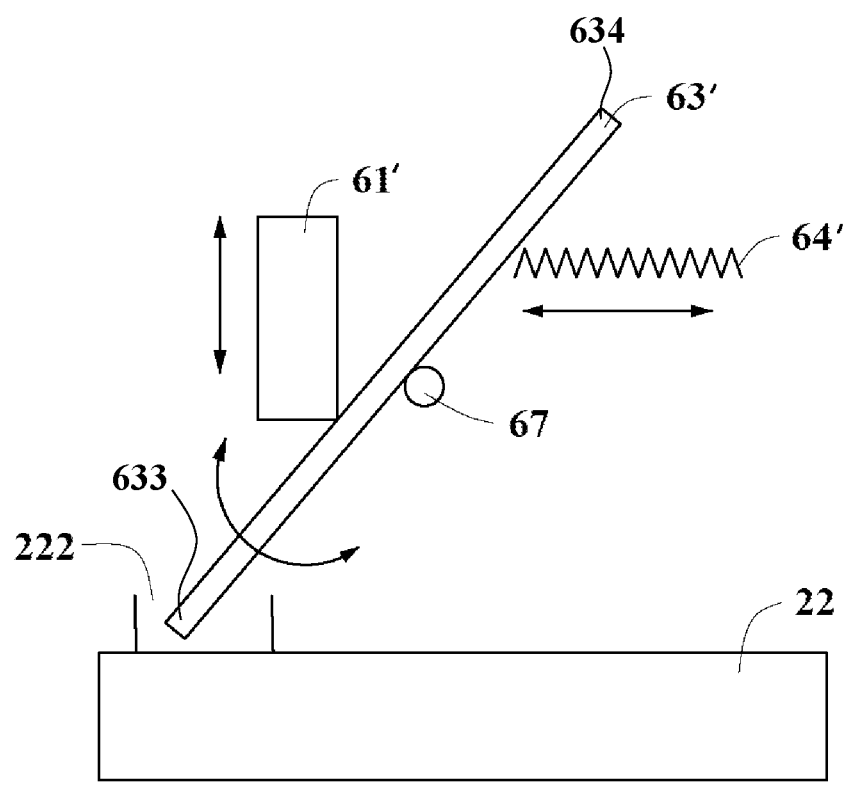
FIG. 17 is a simplified diagram showing the locking structure of the gimbal of FIG. 1 in accordance with yet another embodiment.

FIG. 17 is a simplified diagram showing the locking structure 6 in accordance with yet another embodiment. Different from the configuration shown in FIG. 16, the elastic member 64' can be an elastic stretching member and connected to the driving end 634 of the positioning snap member 63'. The positioning snap member 63' can be maintained to be disengaged from the bearing member 22 under an elastic force of the elastic member 64'. The engaging end 633 can be pushed by the locking switch to engage with the bearing member 22 when the bearing member 22 is rotated relative to the rotating member 21 to a preset position.

In some other embodiments, the locking structure 6 can be provided at the bearing member 22. The yaw-axis locking of the gimbal 100 can be effected by engaging the locking structure 6 with the rotating member 21.

Figure 18:
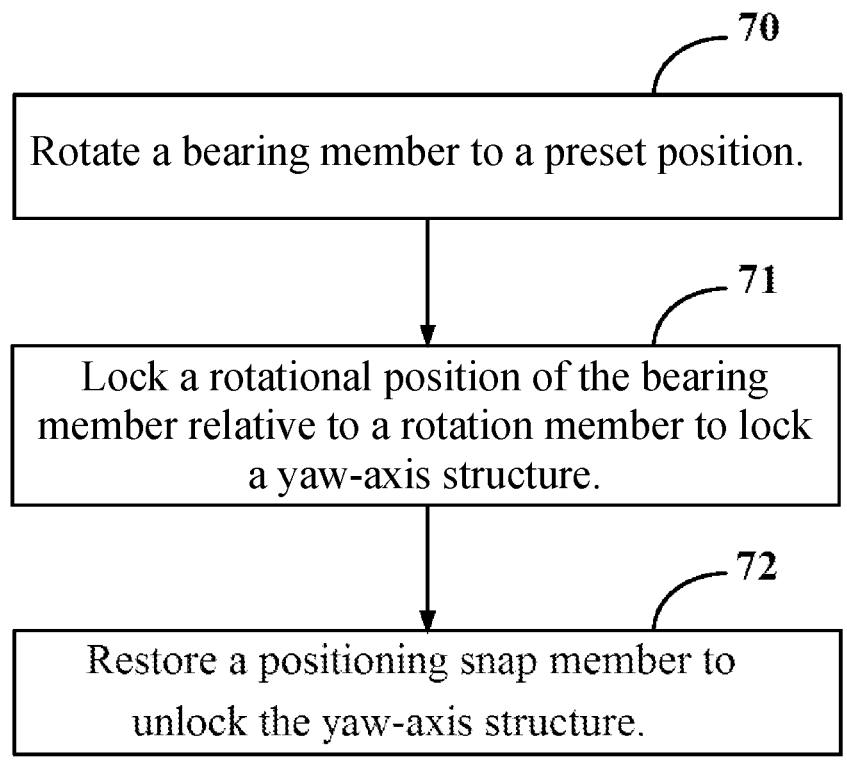
FIG. 18 is a flowchart of a method of controlling a gimbal in accordance with embodiments of the disclosure.

FIG. 18 illustrates a method of controlling the gimbal 100. As shown in FIG. 18, at 70, the bearing member 22 is rotated to a preset position. At 71, a rotational position of the bearing member 22 relative to the rotating member 21 is locked, placing the yaw-axis structure 2 into a locked state. At 72, a position of the positioning snap member 63 or 63' is restored to unlock the yaw-axis structure 2.

In some embodiments, locking the rotational position of the bearing member 22 relative to the rotating member 21 (process 71 in FIG. 18) can comprise pushing the positioning snap member 63 or 63' to protrude or rotate, such that the positioning snap member 63 or 63' is snapped to a corresponding one of the rotating member 21 and the bearing member 22.

In some embodiments, restoring the position of the positioning snap member 63 or 63' to unlock the yaw-axis structure 2 (process 72 in FIG. 18) can comprise restoring the position of the positioning snap member 63 or 63' to unlock the yaw-axis structure by an elastic restoring force provided by the elastic member 64 or 64' connected to the positioning snap member 63 or 63'. In some other embodiments, the position of the positioning snap member 63 or 63' can be restored to unlock the yaw-axis structure by raising or reversely rotating the positioning snap member 63 or 63' using the locking switch 61 or 61'.

The gimbal 100 can be applied to various types of gimbal mechanisms, such as a gimbal onboard an unmanned aerial vehicle, a gimbal onboard a land vehicle, a handle gimbal, or a handheld gimbal. For example, the gimbal 100 can be used in a handle gimbal which comprises a handle and the gimbal 100. The handle can include a battery compartment for one or more batteries. The gimbal 100 can be coupled to the handle. For example, the yaw-axis structure 2 of the gimbal 100 can be connected to the handle. The roll-axis structure 3 can be connected to the yaw-axis structure 2 and can be rotated by the yaw-axis structure 2. The pitch-axis structure 1 can be connected to the roll-axis structure 3 and can be rotated by the roll-axis structure 3. The pitch-axis structure 1 can be configured to support a load and drive the load to rotate. The yaw-axis structure 2 can include the locking structure 5. When the roll-axis structure 3 is rotated by the yaw-axis structure 2 to a preset position in a non-operational state of the gimbal, the rotating member 21 and the bearing member 22 of the yaw-axis structure 2, which are rotatable with respect to one another, can be engaged with each other by the snap-fit portion of the locking structure, such that the yaw-axis structure 2 is locked.

According to the gimbal 100, the locking structure of the gimbal 100, and the method of controlling the gimbal 100 provided by embodiments of the disclosure, when the gimbal 100 rotates about the yaw axis while the gimbal 100 is in the non-operational state, the positioning snap member can be pushed out at a preset position to engage with the rotating member 21 or the bearing member 22 of the yaw-axis structure 2, to effect the yaw-axis locking of the gimbal 100 in the non-operational state. Furthermore, the yaw-axis locking of the gimbal 100 in the non-operational state can be conveniently effected as the preset position can be reached automatically using the elastic member.

The foregoing disclosure is merely illustrative of the embodiments of the disclosure but not intended to limit the scope of the disclosure. Any equivalent modifications to a structure or process flow, which are made without departing from the specification and the drawings of the disclosure, and a direct or indirect application in other relevant technical fields, shall also fall into the scope of the disclosure.

What is claimed is:

1. A gimbal comprising:
   an axis structure including:
      a rotating member including a rotor of a motor or a member fixedly connected to a rotor;
      a bearing member rotatably connected to the rotating member and including a stator of the motor or a member fixedly connected to a stator; and
      a locking structure including a positioning snap member movably provided on one of the rotating member and the bearing member and configured to engage with another one of the rotating member and the bearing member,
   wherein the axis structure is a yaw-axis structure, a roll-axis structure or a pitch-axis structure, and the motor is configured to control a movement about a pitch axis, a movement about a yaw axis, or a movement about a roll axis, a rotational position of the rotating member relative to the bearing member being locked by the locking structure when the rotating member rotates to a preset position.

2. The gimbal of claim 1, wherein the locking structure further includes:
   an elastic member configured to provide an elastic restoring force to the positioning snap member, to automatically restore a position of the positioning snap member.

3. The gimbal of claim 2, wherein:
   the positioning snap member is rotatably connected to the one of the rotating member and the bearing member.

4. The gimbal of claim 3, wherein:
   the locking structure further includes a locking switch coupled with the positioning snap member; and
   the positioning snap member is configured to be driven by the elastic member to rotate relative to the locking switch to automatically enter a locked state.

5. The gimbal of claim 2, wherein the locking structure further includes:
   a locking switch coupled with the positioning snap member and configured to drive the positioning snap member to move relative to the one of the rotating member and the bearing member.

6. The gimbal of claim 5, wherein the locking switch is configured to drive the positioning snap member to move to put the positioning snap member in an unlocked state.

7. The gimbal of claim 5, wherein the locking switch is slidably connected to the one of the rotating member and the bearing member, and is configured to drive the positioning snap member to move relative to the other one of the rotating member and the bearing member, such that the positioning snap member is engaged with or disengaged from the other one of the rotating member and the bearing member.

8. The gimbal of claim 5, wherein one end of the positioning snap member is connected to the elastic member and another end of the positioning snap member includes a snap-fit portion configured to be snapped to the other one of the rotating member and the bearing member to effect an axis locking of the gimbal.

9. The gimbal of claim 8, wherein the locking switch is configured to be pushed downwards to exert a pressure on the positioning snap member, such that the snap-fit portion of the positioning snap member is disengaged from the other one of the rotating member and the bearing member.

10. The gimbal of claim 5, wherein the positioning snap member and the locking switch are configured to move relative to each other.

11. The gimbal of claim 5, wherein:
    the locking switch is configured to drive the positioning snap member to rotate about a shaft.

12. The gimbal of claim 2, wherein the positioning snap member is configured to engage with the other one of the rotating member and the bearing member under an elastic force of the elastic member in response to the bearing member rotating relative to the rotating member to the preset position.

13. The gimbal of claim 2, wherein the elastic member is configured to, at the preset position, push out the positioning snap member, such that the positioning snap member engages with the rotating member or the bearing member, realizing locking of the axis structure in a non-operational state of the gimbal.

14. The gimbal of claim 2, wherein the elastic member includes an elastic compressing member for providing a pushing force onto the positioning snap member.

15. A handle gimbal comprising:
    a handle including a battery compartment; and
    a gimbal including an axis structure coupled to the handle and including:
       a rotating member including a rotor of a motor or a member fixedly connected to a rotor;
       a bearing member rotatably connected to the rotating member and including a stator of the motor or a member fixedly connected to a stator; and
       a locking structure including a positioning snap member movably provided on one of the rotating member and the bearing member and configured to engage with another one of the rotating member and the bearing member;
    wherein the axis structure is a yaw-axis structure, a roll-axis structure or a pitch-axis structure, and the motor is configured to control a movement about a pitch axis, a movement about a yaw axis, or a movement about a roll axis, a rotational position of the rotating member relative to the bearing member being locked by the locking structure when the rotating member rotates to a preset position.

* * * * *